United States Patent [19]
Furuhashi

[11] Patent Number: 5,718,515
[45] Date of Patent: Feb. 17, 1998

[54] RECTILINEAR GUIDE APPARATUS

[75] Inventor: Hidehiko Furuhashi, Fujisawa, Japan

[73] Assignee: Nikon Corporation, Tokyo, Japan

[21] Appl. No.: 461,545

[22] Filed: Jun. 5, 1995

Related U.S. Application Data

[63] Continuation of Ser. No. 68,082, May 28, 1993, abandoned.

[30] Foreign Application Priority Data

Jun. 8, 1992 [JP] Japan .................... 4-173832

[51] Int. Cl.⁶ .............. F16C 19/00; F16C 29/04; F16C 33/00
[52] U.S. Cl. .............. 384/53; 384/50; 384/49; 384/59
[58] Field of Search ............... 384/49, 50, 52, 384/53, 56, 59

[56] References Cited

U.S. PATENT DOCUMENTS

| | | | |
|---|---|---|---|
| 2,525,712 | 10/1950 | Neighbour | 384/57 |
| 2,918,333 | 12/1959 | Friedman | 384/57 |
| 3,004,802 | 10/1961 | Maurer et al. | 384/57 |
| 3,210,135 | 10/1965 | Goller | 384/56 |
| 3,778,121 | 12/1973 | Levesque | 384/47 |
| 5,004,203 | 4/1991 | Fabius | 384/53 |
| 5,161,926 | 11/1992 | Schulz | 384/53 |

FOREIGN PATENT DOCUMENTS

| | | | |
|---|---|---|---|
| 12129 | 1/1989 | Japan | 384/50 |
| 3-58011 | 3/1991 | Japan . | |

Primary Examiner—Bibhu Mohanty
Attorney, Agent, or Firm—Shapiro and Shapiro

[57] ABSTRACT

In a rectilinear guide apparatus wherein a female guide is disposed outside a male guide and four rows, for example, of rollers are interposed between the two guides and the male guide is rectilinearly movable relative to the female guide, rollers in two of the four rows are oriented in the same direction and all rollers in the other two rows are inclined so as to be substantially orthogonal to the rotation center axes of the rollers in the first-mentioned two rows. This rectilinear guide apparatus provides an effect similar to a combination of two rows of cross rollers, but provides higher strength and simplifies working of the rolling surfaces of the rollers.

32 Claims, 6 Drawing Sheets

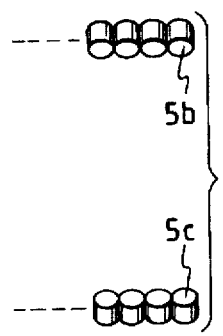
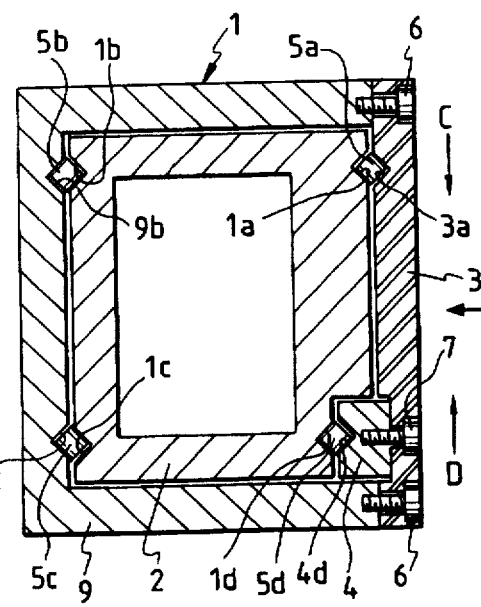
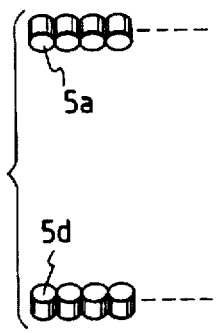
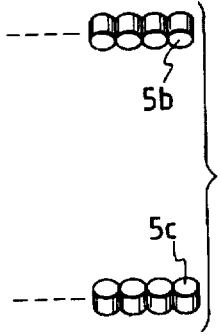
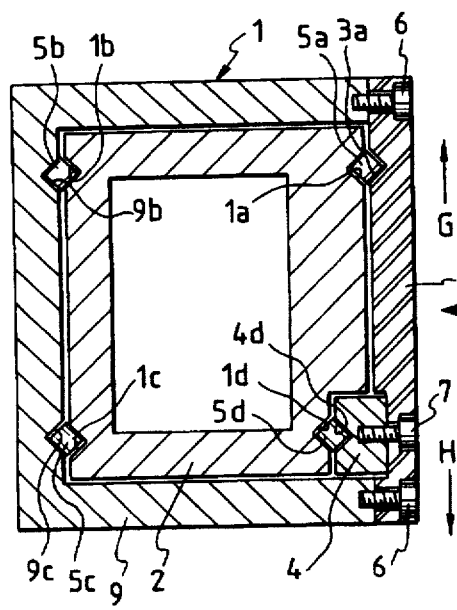
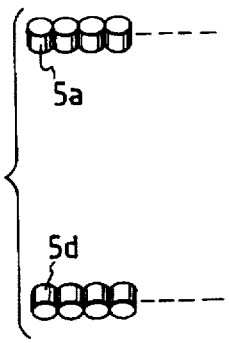

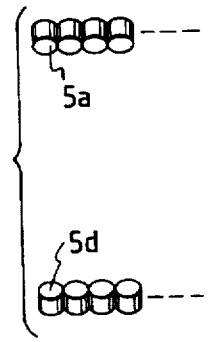
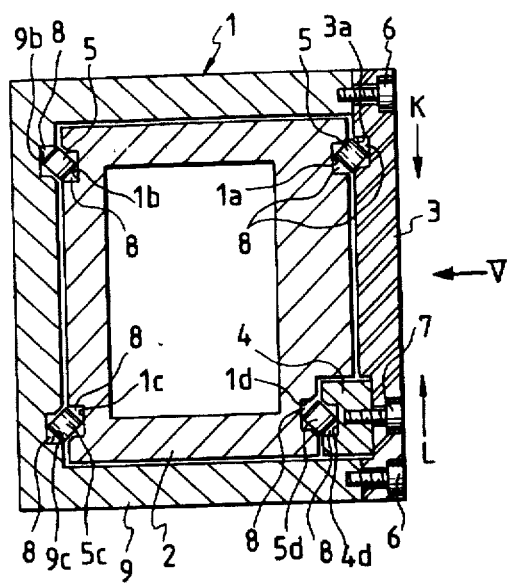
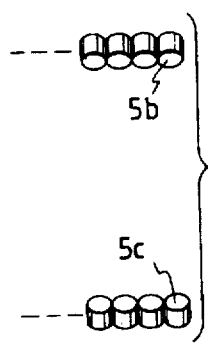
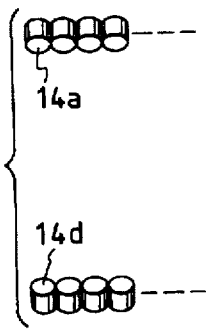
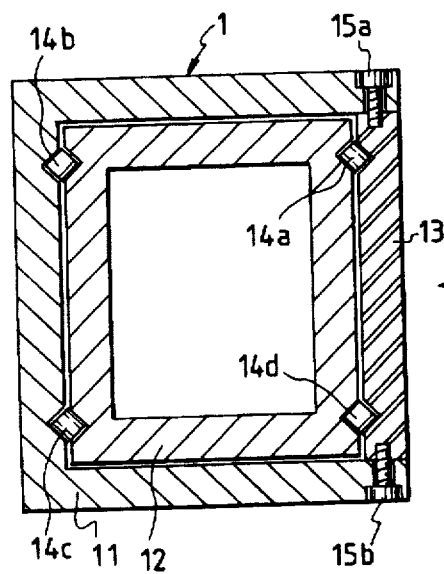
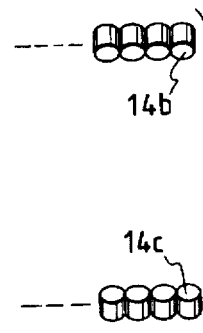

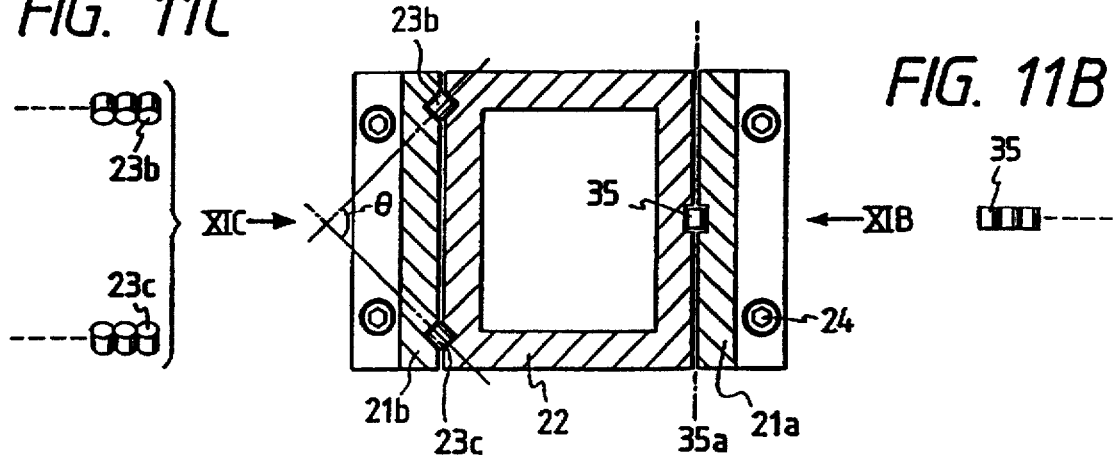
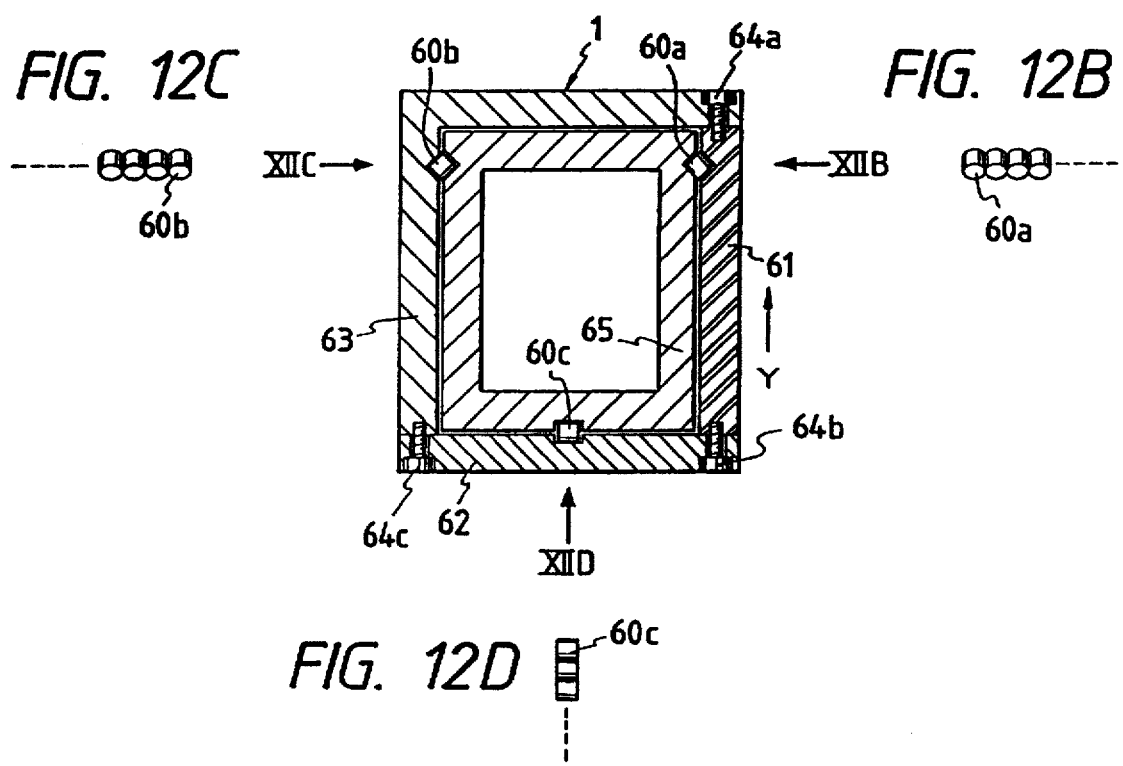

RECTILINEAR GUIDE APPARATUS

This is a continuation of application Ser. No. 08/068,082 filed May 28, 1993, now abandoned.

BACKGROUND OF THE INVENTION

1. Field of the Invention

This invention relates to a rectilinear guide apparatus, and particularly to a rectilinear guide apparatus available, for example, as a moving mechanism for a stage.

2. Related Background Art

FIGS. 1A and 2 of the accompanying drawings are cross-sectional views of prior-art rectilinear guide apparatuses as they are sectioned at right angles with respect to the direction of rectilinear movement, and FIG. 1B of the accompanying drawings is a cross-sectional view showing the arrangement of the rollers of the rectilinear guide apparatus and taken along the arrow IB of FIG. 1A.

The rectilinear guide apparatus of FIGS. 1A and 1B comprises a second member 42 inserted in a first member 46 with two rows of cross rollers 44a and 44b interposed therebetween, and the second member 42 is rectilinearly guided in a predetermined direction. The first member 46 is comprised of a first member body 41 and an adjusting guide 43 fixed thereto. The cross rollers 44a and 44b are a series of rollers as shown in FIG. 1B, and the rotation center axes of adjacent ones of these rollers are orthogonal to each other. By screwing a small screw 45 into the first member, the second member 42 is fastened through the rollers 44a and 44b.

In the rectilinear guide apparatus of FIGS. 1A and 1B thus constructed, if a stage is supported in a cantilever fashion by the second member 42 and a center of load is at a location off the center position 0 between the two rows of cross rollers 44a and 44b, a great load will be applied to the rollers under the influence of a moment load, whereby the rollers will be deformed.

Where the rectilinear guide apparatus shown in FIGS. 1A and 1B is used in an apparatus such as a microscope for effecting magnified observation therethrough, there has been the disadvantage that the observed image is seen swaying due to the deformation or positional deviation of the rollers.

In contrast with the rectilinear guide apparatus of FIGS. 1A and 1B, in the rectilinear guide apparatus of FIG. 2, a second member 52 is inserted in a first member 57 with two sets of needle-like rollers 54 arranged in a V-shape being interposed therebetween, and the second member 52 is made rectilinearly movable in a predetermined direction. The second member 52 will be fastened when a small screw 56 is screwed into the first member. The rollers 54 are held by roller cages 55.

In the rectilinear guide apparatus of FIG. 2 thus constructed, as compared with the rectilinear guide apparatus of FIGS. 1A and 1B, the area of contact of the rollers becomes great and the strength thereof becomes high.

However, even in the rectilinear guide apparatus of FIG. 2, when used in an apparatus such as a microscope for effecting magnified observation therethrough, there has been a problem that sufficient strength is not yet obtained and to obtain sufficient strength, the structure of the second member 52 and first member 57 becomes bulky.

A rectilinear guide apparatus having high strength as compared with the rectilinear guide apparatuses of FIGS. 1A, 1B and 2 is described in Japanese Laid-Open Patent Application No. 3-58011. This rectilinear guide apparatus is provided with a square tube-shaped first member fixed to a microscope body, a second member contained in the first member, and four roller guide mechanisms provided between the four corners of the second member and the first member.

The second member for supporting a stage is a hollow box type stand and the roller guide mechanisms are provided at the four corners of the second member, and therefore, the strength as a rectilinear guide apparatus is high.

However, if the cross rollers shown in FIGS. 1A and 1B are used in such roller guide mechanisms, a significant practical problem is presented because high working accuracy will be required of the rolling surfaces for the rollers of the respective roller guide mechanisms. In such an arrangement, four surfaces become necessary as the rolling surfaces for the rollers of each roller guide mechanism, and these rolling surfaces must be worked for each of the four roller guide mechanisms. Also, the rolling surfaces of each guide mechanism would have to be made parallel to the rolling surfaces for the rollers of the remaining roller guide mechanism. The necessary working of the rolling surfaces would thus be difficult and time consuming. Accordingly, manufacturing costs will become higher. Moreover, there may arise a problem that much time would be required for the adjustment of each roller guide mechanism during assemblage.

SUMMARY OF THE INVENTION

It is an object of the present invention to provide a rectilinear guide apparatus which has high strength and is easy to work and assemble and of which the manufacturing cost can be reduced.

The above object is achieved by a rectilinear guide apparatus provided with a first guide member, a second guide member relatively movably guided by said first guide member, and first, second and third roller rows disposed between said first guide member and said second guide member and extending parallel to one another in the direction of relative movement of said first guide member and said second guide member, each of said first, second and third roller rows having a plurality of rollers arranged in the direction of relative movement of said first guide member and said second guide member, the rotational axes of said plurality of rollers of said first roller row being parallel to one another and oriented in the same predetermined direction, the rotational axes of said plurality of rollers of said second roller row being parallel to one another and oriented in a direction intersecting said predetermined direction.

Also, the above object can be achieved by a rectilinear guide apparatus provided with a first guide member, a second guide member relatively movably guided by said first guide member, and first, second, third and fourth roller rows disposed between said first guide member and said second guide member and extending parallel to one another in the direction of relative movement of said first guide member and said second guide member, each of said first, second, third and fourth roller rows having a plurality of rollers arranged in the direction of relative movement of said first guide member and said second guide member, the rotational axes of said first roller row and said third roller row being parallel to each other and oriented in the same predetermined direction, the rotational axes of said second roller row and said fourth roller row being parallel to each other and oriented in a direction intersecting said predetermined direction.

In the rectilinear guide apparatus of the present invention, the rotational axes of said rollers of said first roller row are made parallel to one another and all rotational axes are turned in the same predetermined direction, and the rotational axes of said rollers of said second roller row are made parallel to one another and all rotational axes are turned in a direction substantially orthogonal to said predetermined direction. The effect is similar to that of one row of cross rollers, but working and assemblage are facilitated considerably.

Also, if as compared with a rectilinear guide apparatus using two rows of cross rollers, the lengths of guide grooves are equal, then the number of the rolling surfaces of the rollers can be the same and the number of the rollers can be doubled. Thus, there can be provided a rectilinear guide apparatus which is excellent in rigidity and shakeproof property.

Further, there can be obtained the same strength as that of a rectilinear guide apparatus using four or three rows of cross roller guide mechanisms. Because use is made of rows of rollers differing in direction from each other, however, the working of guide grooves becomes easy and the assemblage of the rectilinear guide apparatus becomes easy.

BRIEF DESCRIPTION OF THE DRAWINGS

FIGS. 3A–3C are views for illustrating a rectilinear guide apparatus according to a first embodiment of the present invention.

FIGS. 4A–4C are views for illustrating a rectilinear guide apparatus according to a second embodiment of the present invention.

FIGS. 5A–5C are views for illustrating a rectilinear guide apparatus according to a third embodiment of the present invention.

FIGS. 6A–6C are views for illustrating a rectilinear guide apparatus according to a fourth embodiment of the present invention.

FIGS. 11A–11C are views for illustrating a rectilinear guide apparatus according to a seventh embodiment of the present invention.

FIGS. 12A–12D are views for illustrating a rectilinear guide apparatus according to an eighth embodiment of the present invention.

DETAILED DESCRIPTION OF THE PREFERRED EMBODIMENTS

Figure 1A:
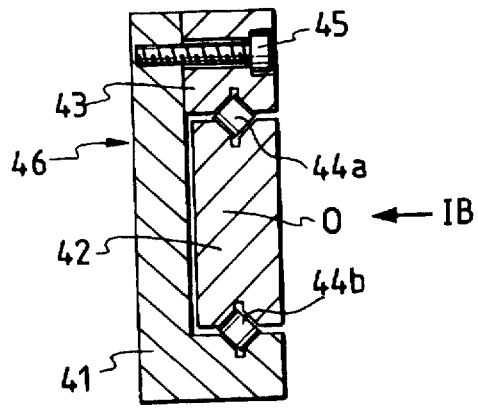
FIGS. 1A and 1B are views for illustrating a rectilinear guide apparatus according to the prior art.

Some embodiments of the present invention will hereinafter be described with reference to the drawings.

FIG. 3A is a cross-sectional view of a rectilinear guide apparatus according to a first embodiment of the present invention as it is sectioned at right angles with respect to the direction of rectilinear movement. FIG. 3B is a view showing the arrangement of the rollers of the rectilinear guide apparatus and taken along the arrow IIIB of FIG. 3A, and FIG. 3C is a view showing the arrangement of the rollers of the rectilinear guide apparatus and taken along the arrow IIIC of FIG. 3A.

This rectilinear guide apparatus includes a hollow second member 2 of generally rectangular cross-section provided with parallel outer side (right and left) surfaces, a first member 1 circumferentially surrounding the second member 2 and provided with parallel inner side (right and left) surfaces opposed to the outer side surfaces of the second member 2, and four rows of rollers 5a–5d interposed between the second member 2 and the first member 1.

When the second member 2 is fixed to a base, not shown, the first member 1 becomes a moving member moving relative to the second member 2 (guide member), and when the first member 1 is fixed to a base, not shown, the second member 2 becomes a moving member moving relative to the first member 1 (guide member).

Accordingly, there is a case where the second member 2 is guided by the first member 1, and there is a case where the first member 1 is guided by the second member 2.

The first member 1 is comprised of a first member body 9 of U-shaped cross-section, a plate-like adjusting guide 3 and an elongate adjusting guide 4. The adjusting guide 3 is fixed to the first member body 9 by means of small screws 6, and the adjusting guide 4 is fixed to the inner wall surface of the adjusting guide 3 by means of a small screw 7.

V-shaped grooves 1a–1d as roller guide grooves are formed in the outer wall surface near the four corners of the second member 2.

V-shaped grooves 9b and 9c opposed to the V-shaped grooves 1b and 1c, respectively, are formed in the inner wall surface of the first member body 9.

A V-shaped groove 3a opposed to the V-shaped groove 1a is formed in the inner wall surface of the adjusting guide 3.

A V-shaped groove 4d opposed to the V-shaped groove 1d is formed in the inner wall surface of the adjusting guide 4.

Spaces for containing the rollers 5a–5d therein are defined by these opposed V-shaped grooves. The rollers 5a–5d arranged in respective rows as shown in FIGS. 3B and 3C are contained between the opposed V-shaped grooves. The rollers 5a between the V-shaped grooves 1a and 3a and the rollers 5c between the V-shaped grooves 1c and 9c are arranged in the same direction, and the rollers 5b between the V-shaped grooves 1b and 9b and the rollers 5d between the V-shaped grooves 1d and 4d are arranged in the same direction. The rotation center axes of the rollers 5a and 5c are substantially orthogonal to the rotation center axes of the rollers 5b and 5d. The rollers 5a and rollers 5d correspond to one row of cross rollers in FIGS. 1A and 1B, and the rollers 5b and rollers 5c correspond to the other row of cross rollers.

Figure 1B:
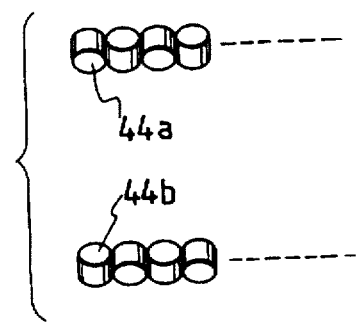
Figure 2:
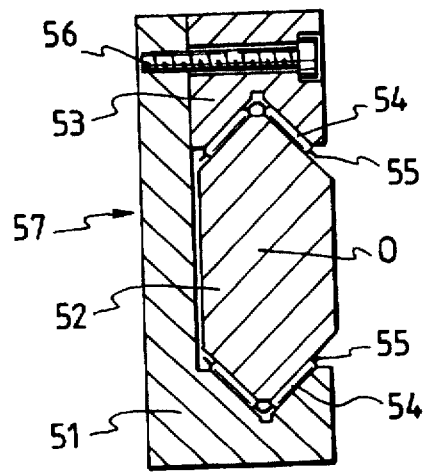
FIG. 2 is a cross-sectional view of a rectilinear guide apparatus according to the prior art as it is sectioned at right angles with respect to the direction of rectilinear movement.

Accordingly, the basic principle as a guide mechanism is the same as the combination of the two rows of cross rollers of FIGS. 1A and 1B.

When the small screws 6 are screwed in, the adjusting guide 3 is urged in the direction of arrow C, and when the screw 7 is screwed in, the adjusting guide 4 is urged in the direction of arrow D. Thus, when the screws are fixed, the second member 2 is fastened through the rollers 5a, 5c, 5b and 5d.

If as compared with the rectilinear guide apparatus of FIGS. 1A and 1B, the lengths of the V-shaped grooves are equal, the number of the rollers oriented in a given direction becomes double. That is, two rows of rollers differing in direction correspond to the one row of cross rollers (one rectilinear guide mechanism) of FIGS. 1A and 1B. Therefore, the number of rollers can be doubled for the same number of rolling surfaces for the rollers. As a result, strength becomes double.

As previously described, the basic principle of this rectilinear guide apparatus as a guide mechanism is the same as the combination of the two rows of rollers of FIGS. 1A and 1B. Accordingly, the working and assemblage of the rectilinear guide apparatus are as easy as in the case of the rectilinear guide apparatus of FIGS. 1A and 1B, and the strength thereof is equal to that of a rectilinear guide apparatus using four rows of cross rollers.

FIG. 4A is a cross-sectional view of a rectilinear guide apparatus according to a second embodiment as it is sectioned at right angles with respect to the direction of rectilinear movement. FIG. 4B is a view showing the arrangement of rollers of the rectilinear guide apparatus and taken along the arrow IVB of FIG. 4A, and FIG. 4C is a view showing the arrangement of rollers of the rectilinear guide apparatus and taken along the arrow IVC of FIG. 4A.

In this embodiment, portions common to those in the first embodiment shown in FIGS. 3A–3C are given the same reference characters and need not be described.

In the second embodiment, the directions of the rollers 5a and 5b on the adjusting guides 3 and 4 sides are opposite to those in the rectilinear guide apparatus of the first embodiment, as shown in FIGS. 4B and 4C.

Accordingly, when the adjusting guide 3 is moved in the direction of arrow G in FIG. 4A, the second member 2 is fastened through the rollers 5a and 5b, and when the adjusting guide 4 is moved in the direction of arrow H in FIG. 4A, the second member 2 is fastened through the rollers 5c and 5d.

FIG. 5A is a cross-sectional view of a rectilinear guide apparatus according to a third embodiment as it is sectioned at right angles with respect to the direction of rectilinear movement. FIG. 5B is a view showing the arrangement of rollers of the rectilinear guide apparatus and taken along the arrow VB of FIG. 5A, and FIG. 5C is a view showing the arrangement of rollers of the rectilinear guide apparatus and taken along the arrow VC of FIG. 5A.

In this embodiment, portions common to those in the first embodiment shown in FIGS. 3A–3C are given the same reference characters and need not be described.

In the third embodiment, guide grooves 1a–1d, 3a, 9b, 9c and 4d are grooves of rectangular cross-sectional shape, and wire rods 8 of high hardness (such as stainless steel or hardened steel) having an isosceles triangular cross-section are fixed to the corner portions of those grooves. The rollers 5a–5d roll on the surfaces of the wire rods 8 and the second member 2 moves rectilinearly.

The directions of the rollers 5a–5d are the same as those in the first embodiment, as shown in FIGS. 5B and 5C. When the adjusting guide 3 is moved in the direction of arrow K in FIG. 5A, the second member 2 is fastened through the rollers 5a and 5c, and when the adjusting guide 4 is moved in the direction of arrow L in FIG. 5A, the second member 2 is fastened through the rollers 5b and 5d.

According to this embodiment, the wire rods 8 of high hardness are used for the portions of contact with the rollers 5a–5d. Therefore, a light alloy or the like can be used as the material of the guides 1–4, and the entire apparatus can be made lighter in weight.

FIG. 6A is a cross-sectional view of a rectilinear guide apparatus according to a fourth embodiment as it is sectioned at right angles with respect to the direction of rectilinear movement. FIG. 6B is a view showing the arrangement of rollers of the rectilinear guide apparatus and taken along the arrow VIB of FIG. 6A, and FIG. 6C is a view showing the arrangement of rollers of the rectilinear guide apparatus and taken along the arrow VIC of FIG. 6A.

In the fourth embodiment, a plate-like adjusting guide 13 is held between the opposite end portions of a first member body 11, and is fixed to the first member body 11 by means of small screws 15a and 15b, and the fastening of a second member 12 is adjusted by this single adjusting guide 13.

The second member 12 is fastened through rollers 14a–14d.

Figure 7A:
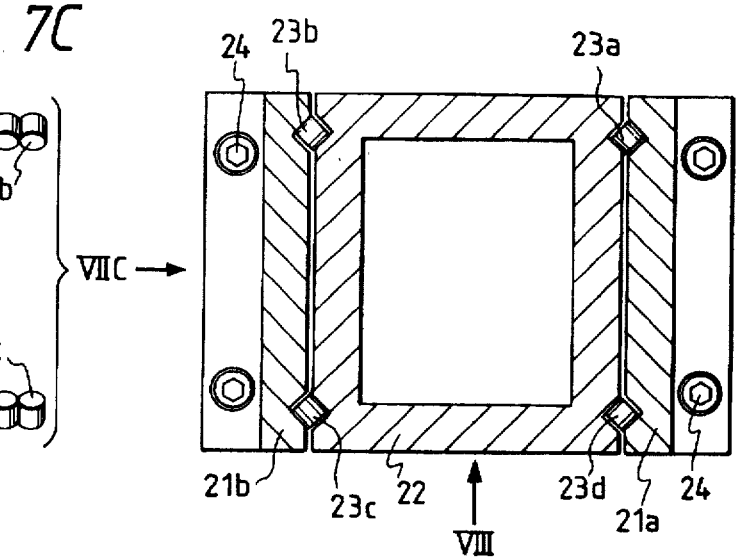
FIGS. 7A–7C are views for illustrating a rectilinear guide apparatus according to a fifth embodiment of the present invention.
Figure 7C:
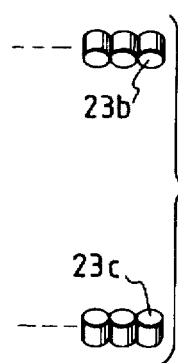
Figure 7B:
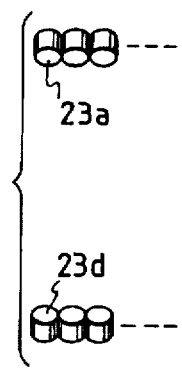
Figure 8:
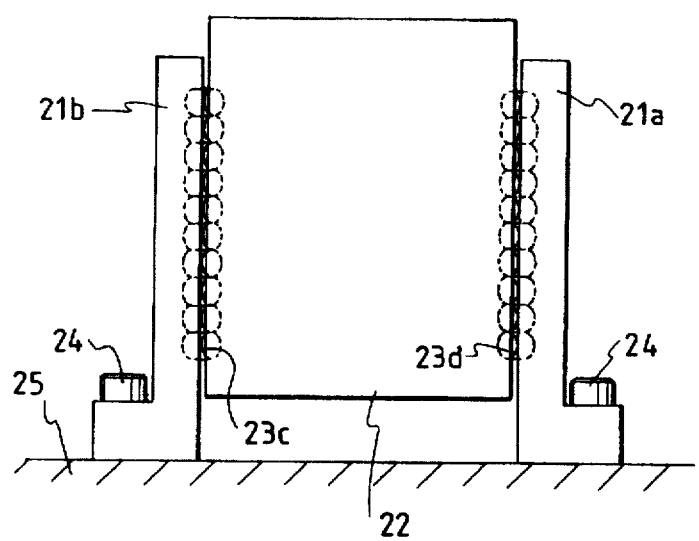
FIG. 8 is a view taken along the arrow VIII of FIG. 7A.

FIG. 7A is a cross-sectional view of a rectilinear guide apparatus according to a fifth embodiment as it is sectioned at right angles with respect to the direction of rectilinear movement. FIG. 7B is a view showing the arrangement of rollers of the rectilinear guide apparatus and taken along the arrow VIIB of FIG. 7A, and FIG. 7C is a view showing the arrangement of rollers of the rectilinear guide apparatus and taken along the arrow VIIC of FIG. 7A. FIG. 8 is a view taken along the arrow VIII of FIG. 7A.

In the fifth embodiment, two L-shaped first members 21a and 21b are fixed to the base 25 of a microscope by means of small screws 24 (see FIG. 8), and a second member 22 is held between the two first members with rollers 23a–23d interposed therebetween.

Accordingly, the second member 22 (moving member) is designed to be guided by the two first members 21a and 21b (guide members).

That is, spaces in which the rollers 23a–23d are disposed are formed between the first members 21a, 21b and the second member 22.

The directions of the four rows of rollers 23a–23d are the same as those in the rectilinear guide apparatus of the first embodiment, as shown in FIGS. 7B and 7C.

In the case of the present embodiment, it is possible to mount parts on the sides of the second member 22.

Figure 9C:
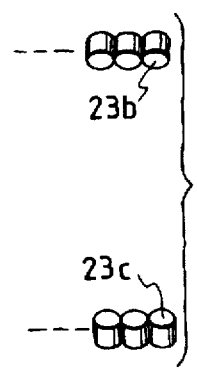
FIGS. 9A–9C are views for illustrating a rectilinear guide apparatus according to a sixth embodiment of the present invention.
Figure 9A:
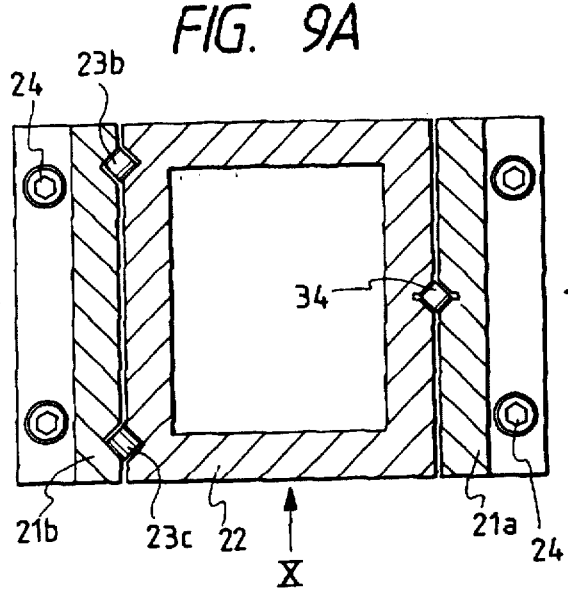
Figure 9B:
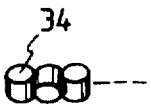
Figure 10:
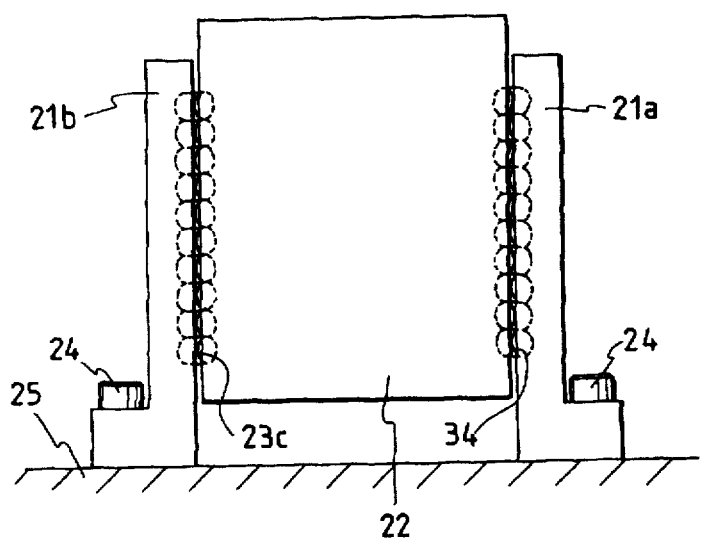
FIG. 10 is a view taken along the arrow X of FIG. 9A.

FIG. 9A is a cross-sectional view of a rectilinear guide apparatus according to a sixth embodiment as it is sectioned at right angles with respect to the direction of rectilinear movement. FIG. 9B is a view showing the arrangement of rollers of the rectilinear guide apparatus and taken along the arrow IXB of FIG. 9A, FIG. 9C is a view showing the arrangement of rollers of the rectilinear guide apparatus and taken along the arrow IXC of FIG. 9A. FIG. 10 is a view taken along the arrow X of FIG. 9A.

In this embodiment, portions common to those in the fifth embodiment shown in FIGS. 7A–7C are given the same reference characters and need not be described.

The sixth embodiment differs from the fifth embodiment only in that rollers 34 rolling on one first member 21a are cross rollers 34 as shown in FIG. 9B.

The use of two rows of rollers 23b and 23c in the same direction and one row of cross rollers 34 can also obtain an effect similar to that of the first embodiment.

FIG. 11A is a cross-sectional view of a rectilinear guide apparatus according to a seventh embodiment as it is sectioned at right angles with respect to the direction of rectilinear movement. FIG. 11B is a view showing the arrangement of rollers of the rectilinear guide apparatus and taken along the arrow XIB of FIG. 11A, and FIG. 11C is a view showing the arrangement of rollers of the rectilinear guide apparatus and taken along the arrow XIC of FIG. 11A.

In this embodiment, portions common to those in the sixth embodiment shown in FIGS. 9A–9C are given the same reference characters and need not be described.

The seventh embodiment is the same as the sixth embodiment shown in FIGS. 9A–9C in that the rotation center axis of rollers 23b and the rotation center axis of rollers 23c intersect each other. However, in the seventh embodiment, the guide groove of one first member 21a is a groove of rectangular cross-sectional shape and the guide groove of the second member 22 opposed to said guide groove also is a groove of rectangular cross-sectional shape, and the rotation center axes of rollers 35 are disposed so as to be parallel to the side of the second member 22.

When the angle formed between the rotation center axis of the rollers 23b and the rotation center axis of the rollers 23c is θ, the rotation center axis of the rollers 35 can be inclined up to a maximum range [(180°-θ)/2] from the state shown in FIG. 11A in which the rotation center axis coincides with a reference position 35a.

That is, if within this range, the rotation center axis of the rollers 35 will not become parallel to the rotation center axis of the rollers 23b or the rollers 23c and smooth rectilinear movement of the second member 22 can be ensured.

In the present embodiment, the two rows of rollers 23b and 23c having rotation center axes intersecting each other must be disposed between one first member 21b and the second member 22, and the rollers 35 must be disposed between the other first member 21a and the second member 22.

The present embodiment has been described with respect to a case where a row of rollers 35 is interposed between the second member 22 and the first member 21a, but alternatively, two rows of rollers may be interposed.

FIG. 12A is a cross-sectional view of a rectilinear guide apparatus according to an eighth embodiment as it is sectioned at right angles with respect to the direction of rectilinear movement. FIG. 12B is a view showing the arrangement of rollers of the rectilinear guide apparatus and taken along the arrow XIIB of FIG. 12A, FIG. 12C is a view showing the arrangement of rollers of the rectilinear guide apparatus and taken along the arrow XIIC of FIG. 12A, and FIG. 12D is a view showing the arrangement of rollers of the rectilinear guide apparatus and taken along the arrow XIID of FIG. 12A.

This rectilinear guide apparatus includes a hollow second member 65 of generally rectangular cross-section, a first member 1 surrounding the second member 65, and three rows of rollers 60a–60c interposed between the second member 65 and the first member 1.

When the second member 65 is fixed to a base, not shown, the first member 1 becomes a moving member moving relative to the second member 2 (guide member), and when the first member 1 is fixed to the base, not shown, the second member 65 becomes a moving member moving relative to the first member 1 (guide member).

Accordingly, the second member 65 may be guided by the first member 1, or the first member 1 may be guided by the second member 65.

The first member 1 is comprised of a first member body 63 of L-shaped cross-section and plate-like adjusting guides 61 and 62. One end of the adjusting guide 62 is fixed to one end of the first member body 63 by means of a small screw 64c. The adjusting guide 61 is held by and between the other end of the first member body 63 and the other end of the adjusting guide 62, and is fixed to the adjusting guide 62 and the first member body 63 by means of small screws 64a and 64b. The fastening of the second member 65 is adjusted by the adjusting guide 62.

Roller guide grooves in which rollers 60a, 60b and 60c are contained are formed in the outer wall surface of the second member 65 near two adjacent corners thereof and centrally in a side of the outer wall surface opposite the adjacent corners.

These rollers are contained in the respective roller guide grooves in such a manner that the rotation center axis of the rollers 60a and the rotation center axis of the rollers 60c intersect each other and the rotation center axis of the rollers 60c is parallel to the aforementioned side of the second member 65.

If the adjusting guide 62 is urged in the direction of arrow Y when the small screws 64b and 64c are screwed in and fixed, the second member 65 will be fastened through the rollers 60a, 60b and 60c.

Besides the above-described embodiments, the second member may be made cylindrical and the first member may be made into a cylindrical shape containing the entire second member therein. The rotation center axes of the plurality of rows of rollers interposed between the two guides may be made coincident with the tangential line of a circle describing the outline of the second member as it is cut at right angles with respect to the direction of movement, whereby an effect similar to that of the above-described embodiments can be obtained.

Further, where the rectilinear guide apparatus of each embodiment is used as the rectilinear guide apparatus of a microscope or the like, the table on which a sample is placed may be fixed to either of the first member and the second member.

What is claimed is:

1. A rectilinear guide apparatus, comprising:

a guide member having first, second, and third parallel guide grooves provided with roller guiding surfaces;

a moving member having first, second, and third parallel guide grooves provided with roller guiding surfaces and opposed, respectively, to the first, second, and third guide grooves of said guide member;

the first and second guide grooves of said guide member being arranged, respectively, in opposite side surfaces of said guide member, and the first and a second guide grooves of said moving member being arranged, respectively, in opposite side surfaces of said moving member; and three rows of rollers each interposed between a corresponding opposed pair of the guide grooves of said guide member and said moving member and having outer peripheral surfaces rolling on the respective roller guiding surfaces thereof;

wherein the rollers of a first of said rows interposed between said first guide grooves all have their rotational axes oriented parallel to each other in a first direction, the rollers of a second of said rows interposed between said second guide grooves all have their rotational axes oriented parallel to each other in a second direction transverse to said first direction, and the rollers of a third of said rows interposed between said third guide grooves all have their rotation axes oriented parallel to each other in one of said first and second directions; and wherein one of said guide member and said moving member includes a base portion and an adjusting guide portion adjustably attached to said base portion, with said base portion and said adjusting guide portion each having at least one of the guide grooves of said one member formed therein.

2. A rectilinear guide apparatus according to claim 1, wherein said one of said guide member and said moving member circumferentially surrounds the other.

3. A rectilinear guide apparatus according to claim 2, wherein said other member is of generally rectangular cross-section, said base portion of said one member is generally U-shaped, and said adjusting guide portion of said one member is attached to said base portion so as to close an opening of said U-shape.

4. A rectilinear guide apparatus according to claim 3, wherein said adjusting guide portion includes a first adjusting guide member adjustably attached to said base portion and a second adjusting guide member adjustably attached to said first adjusting guide member, and each of said first and second adjusting guide members has one of said guide grooves of said one member formed therein.

5. A rectilinear guide apparatus according to claim 1, wherein said first direction and said second direction are substantially orthogonal.

6. A rectilinear guide apparatus according to claim 1, wherein each of said roller guiding surfaces is constituted by a surface of a high hardness rod disposed in the corresponding guide groove.

7. A rectilinear guide apparatus, comprising:
a guide member having first, second, third, and fourth parallel guide grooves provided with roller guiding surfaces, the first and second guide grooves of said guide member being arranged in one of two opposite side surfaces of said guide member, and the third and fourth guide grooves of said guide member being arranged in the other of said opposite side surfaces of said guide member;
a moving member having first, second, third, and fourth parallel guide grooves provided with roller guiding surfaces and opposed, respectively, to said first, second, third, and fourth guide grooves of said guide member, the first and second guide grooves of said moving member being arranged in one of two opposite side surfaces of said moving member, and a third and fourth guide grooves of said moving member being arranged in the other of said opposite side surfaces of said moving member; and
four rows of rollers each interposed between a corresponding opposed pair of the guide grooves of said guide member and said moving member and having outer peripheral surfaces rolling on the respective roller guiding surfaces thereof;
wherein the rollers of two of said rows all have their rotational axes oriented parallel to each other in a first direction, and the rollers of the remaining rows all have their rotational axes oriented parallel to each other in a second direction transverse to said first direction; and
wherein one of said guide member and said moving member includes a base portion and an adjusting guide portion adjustably attached to said base portion, with said base portion and said adjusting guide portion each having at least one of the guide grooves of said one member formed therein.

8. A rectilinear guide apparatus according to claim 7, wherein said one of said guide member and said moving member circumferentially surrounds the other.

9. A rectilinear guide apparatus according to claim 8, wherein said other member is of generally rectangular cross-section and the guide grooves thereof are formed on two opposite sides thereof, said base portion of said one member is generally U-shaped, and said adjusting guide portion of said one member is attached to said base portion so as to close an opening of said U-shape.

10. A rectilinear guide apparatus according to claim 9, wherein said adjusting guide portion includes a first adjusting guide member adjustably attached to said base portion and a second adjusting guide member adjustably attached to said first adjusting guide member, and each of said first and second adjusting guide members has one of said guide grooves of said one member formed therein.

11. A rectilinear guide apparatus according to claim 7, wherein said first direction and said second direction are substantially orthogonal.

12. A rectilinear guide apparatus according to claim 7, wherein each of said roller guiding surfaces is constituted by a surface of a high hardness rod disposed in the corresponding guide groove.

13. A rectilinear guide apparatus, comprising:
a guide member, a moving member, and at least three rows of rollers each interposed between and rolling at outer peripheries thereof on roller guiding surfaces provided in opposed guide grooves of said guide member and said moving member;
wherein the rollers of two of said rows all have their rotational axes oriented parallel to each other in a first direction, and the rollers of a third of said rows all have their rotational axes oriented parallel to each other in a second direction transverse to said first direction; and
wherein one of said guide member and said moving member includes a base portion, a first adjusting guide member adjustably attached to said base portion, and a second adjusting guide member adjustably attached to said first adjusting guide member, and each of said base portion and said first and second adjusting guide members has one of the guide grooves of said one member formed therein.

14. A rectilinear guide apparatus according to claim 13, wherein said other member is of generally rectangular cross-section and the guide grooves thereof are formed on two opposite sides thereof, said base portion of said one member is generally U-shaped, and said first adjusting guide member of said one member is attached to said base portion so as to close an opening of said U-shape.

15. A rectilinear guide apparatus according to claim 13, wherein said first direction and said second direction are substantially orthogonal.

16. A rectilinear guide apparatus according to claim 13, wherein each of said roller guiding surfaces is constituted by a surface of a high hardness rod disposed in the corresponding guide groove.

17. A rectilinear guide apparatus according to claim 13, wherein said first adjusting guide member is movable in a predetermined direction in a plane parallel to a direction of relative movement of said guide member and said moving member to exert a fastening force, and said second adjusting guide member is movable in a direction opposite to said predetermined direction to exert a fastening force.

18. A rectilinear guide apparatus, comprising:
a guide member having first, second, third, and fourth parallel guide grooves provided with roller guiding surfaces;
a moving member having first, second, and third, and fourth parallel guide grooves provided with roller guiding surfaces and opposed, respectively, to said first, second, third, and fourth guide grooves of said guide member; and four rows of rollers each interposed between a corresponding opposed pair of the guide grooves of said guide member and said moving member and having outer peripheral surfaces rolling on the respective roller guiding surfaces thereof;

wherein one of said guide member and said moving member includes a base portion having the first and second guide grooves of said one member, a first adjusting guide member adjustably attached to said base portion and having the third guide groove of said one member, and a second adjusting guide member adjustably attached to said first adjusting guide member and having the fourth guide groove of said one member; and wherein the rollers of the two of said rows interposed, respectively, between said first guide grooves and said third guide grooves all have their rotational axes oriented parallel to each other in a first direction, and the rollers of the other two rows all have their rotational axes oriented parallel to each other in a second direction transverse to said first direction.

19. A rectilinear guide apparatus according to claim 18, wherein said first direction and said second direction are substantially orthogonal.

20. A rectilinear guide apparatus according to claim 18, wherein each of said roller guiding surfaces is constituted by a surface of a high hardness rod disposed in the corresponding guide groove.

21. A rectilinear guide apparatus, comprising:
a guide member having at least three parallel guide grooves provided with roller guiding surfaces;

a moving member having at least three parallel guide grooves provided with roller guiding surfaces and opposed, respectively, to the guide grooves of said guide member; and three rows of rollers each interposed between a corresponding opposed pair of the guide grooves of said guide member and said moving member and having outer peripheral surfaces rolling on the respective roller guiding surfaces thereof;

wherein the rollers of two of said rows all have their rotational axes oriented parallel to each other in a first direction, and the rollers of the third row all have their rotational axes oriented parallel to each other in a second direction transverse to said first direction; and wherein one of said guide member and said moving member includes a base portion, a first adjusting guide member adjustably attached to said base portion, and a second adjusting guide member adjustably attached to said first adjusting guide member, and each of said base portion and said first and second adjusting guide members has one of the guide grooves of said one member formed therein.

22. A rectilinear guide apparatus according to claim 21, wherein said first adjusting guide member is movable in a predetermined direction in a plane parallel to a direction of relative movement of said guide member and said moving member to exert a fastening force, and said second adjusting guide member is movable in a direction opposite to said predetermined direction to exert a fastening force.

23. A rectilinear guide apparatus according to claim 21, wherein said one of said guide member and said moving member circumferentially surrounds the other.

24. A rectilinear guide apparatus according to claim 23, wherein said other member is of generally rectangular cross-section, said base portion is generally U-shaped, and said first adjusting guide member is attached to said base portion so as to close an opening of said U-shape.

25. A rectilinear guide apparatus, comprising:
a first member having first, second, and third guide surfaces;

a base having a first guide surface opposed to said first guide surface of said first member;

an adjusting member having second and third guide surfaces opposed, respectively, to said second and third guide surfaces of said first member, said adjusting member including a first adjusting portion adjustably attached to said base and which has said second guide surface of said adjusting member, and a second adjusting portion adjustably attached to said first adjusting portion and which has said third guide surface of said adjusting member; and three rows of rollers each interposed between a corresponding opposed pair of the guide surfaces of said first member, said base, and said adjusting member, a plurality of rollers of each row having outer peripheral surfaces rolling on the corresponding guide surfaces, wherein said plurality of rollers of each row are arranged parallel to a direction of relative movement between said first member and said base and adjusting member so as to roll in said direction of relative movement, and wherein the rollers of one of said rows have their rotational axes oriented parallel to each other in a first direction, and the rollers of another of said rows have their rotational axes oriented parallel to each other in a second direction transverse to said first direction.

26. A rectilinear guide apparatus, comprising:
a first member having first, second, third, and fourth guide surfaces;

a base having first and second guide surfaces opposed, respectively, to said first and second guide surfaces of said first member;

an adjusting member having third and fourth guide surfaces opposed, respectively, to said third and fourth guide surfaces of said first member, said adjusting member including a first adjusting portion adjustably attached to said base and which has said third guide surface of said adjusting member, and a second adjusting portion adjustably attached to said first adjusting portion and which has said fourth guide surface of said adjusting member;

a first row of rollers interposed between said first guide surfaces and having outer peripheral surfaces rolling on said first guide surfaces;

a second row of rollers interposed between said second guide surfaces and having outer peripheral surfaces rolling on said second guide surfaces;

a third row of rollers interposed between said third guide surfaces and having outer peripheral surfaces rolling on said third guide surfaces; and a fourth row of rollers interposed between said fourth guide surfaces and having outer peripheral surfaces rolling on said fourth guide surfaces, wherein said rollers of said first, second, third, and fourth rows are arranged parallel to a direction of relative movement between said first member and said base and adjusting member so as to roll in said direction of relative movement, and the rollers of said first and third rows have their rotational axes oriented parallel to each other in a first direction, and the rollers of said second and fourth rows have their rotational axes oriented parallel to each other in a second direction transverse to said first direction.

27. A rectilinear guide apparatus according to claim 26, wherein said first adjusting portion is attached to said base after said first adjusting portion is moved in a direction perpendicular to an attachment direction to adjust a fastening force, and said second adjusting portion is attached to said first adjusting portion after said second adjusting portion is moved in a direction opposite to said perpendicular direction to adjust a fastening force.

28. A rectilinear guide apparatus according to claim 26, wherein said base is generally U-shaped in cross section, said adjusting member includes a plate-like portion to close an opening of said U-shape, and said first member is surrounded by said base and said adjusting member.

29. A rectilinear guide apparatus according to claim 26, wherein said first direction and said second direction are substantially orthogonal.

30. A rectilinear guide apparatus according to claim 26, wherein each of said guide surfaces is constituted by a surface of a high hardness rod.

31. A rectilinear guide apparatus, comprising:

a first member having first and second guide surfaces formed along one side thereof, and having third and fourth guide surfaces formed along another side thereof;

a base having first and second guide surfaces formed along one side thereof and opposed, respectively, to said first and second guide surfaces of said first member;

an adjusting member having third and fourth guide surfaces formed along one side thereof and opposed, respectively, to said third and fourth guide surfaces of said first member, said adjusting member including a first adjusting portion adjustably attached to said base and which has said third guide surface of said adjusting member, and a second adjusting portion adjustably attached to said first adjusting portion and which has said fourth guide surface of said adjusting member;

a first row of rollers interposed between said first guide surfaces and having outer peripheral surfaces rolling on said first guide surfaces;

a second row of rollers interposed between said second guide surfaces and having outer peripheral surfaces rolling on said second guide surfaces;

a third row of rollers interposed between said third guide surfaces and having outer peripheral surfaces rolling on said third guide surfaces; and a fourth row of rollers interposed between said fourth guide surfaces and having outer peripheral surfaces rolling on said fourth guide surfaces, wherein said rollers of said first, second, third, and fourth rows are arranged parallel to a direction of relative movement between said first member and said base and adjusting member so as to roll in said direction of relative movement, the rollers of said first and third rows have their rotational axes oriented parallel to each other in a first direction, and the rollers of said second and fourth rows have their rotational axes oriented parallel to each other in a second direction transverse to said first direction, and said adjusting member adjusts a first fastening force through rollers of said first and third rows and a second fastening force through rollers of said second and fourth rows.

32. A rectilinear guide apparatus according to claim 25, wherein said base is generally U-shaped in cross section, said adjusting member includes a plate-like portion to close an opening of said U-shape, and said first member is surrounded by said base and said adjusting member.

* * * * *